United States Patent [19]
Francis et al.

[11] Patent Number: 5,500,274
[45] Date of Patent: Mar. 19, 1996

[54] COMPOSITE COATING OF VARIABLE THICKNESS HAVING A GRADIENT COLORATION IN THE CROSS-WEB DIRECTION

[75] Inventors: Debra C. Francis, Sayre, Pa.; Siva V. Vallabhaneni, Voorhees, N.J.; Bert C. Wong, Marietta, Ohio

[73] Assignee: E. I. Du Pont de Nemours and Company, Wilmington, Del.

[21] Appl. No.: 196,221

[22] PCT Filed: Sep. 27, 1991

[86] PCT No.: PCT/US91/06899

§ 371 Date: Mar. 22, 1994

§ 102(e) Date: Mar. 22, 1994

[87] PCT Pub. No.: WO93/05946

PCT Pub. Date: Apr. 1, 1993

[51] Int. Cl.⁶ .................................................. B29C 47/04
[52] U.S. Cl. .......................... 428/156; 428/167; 428/161; 428/172; 428/157; 428/437; 428/136; 428/195; 428/525; 428/192; 428/34; 428/38; 428/203; 428/168; 264/173.18; 264/177.1; 264/245; 264/345; 427/261; 427/284; 427/286; 427/372.2; 427/287; 425/131.1; 425/133.5; 425/466
[58] Field of Search ..................... 428/167, 161, 428/172, 157, 156, 136, 195, 525, 192, 34, 38, 203, 168, 437; 425/131.1, 133.5, 466; 264/171, 177.1, 245, 345; 427/261, 284, 286, 372.2, 287

[56] References Cited

U.S. PATENT DOCUMENTS

| | | | |
|---|---|---|---|
| 3,354,025 | 11/1967 | Aykanian et al. | 161/199 |
| 3,405,425 | 10/1968 | Buckley et al. | 264/171 |
| 3,471,898 | 10/1969 | Krystof et al. | 18/13 |
| 3,540,964 | 11/1970 | Nauta | 156/244 |
| 3,799,718 | 3/1974 | Kiyono et al. | 425/131 |
| 4,177,315 | 12/1979 | Ubersax | 428/336 |
| 4,302,263 | 11/1981 | Postupack | 156/100 |
| 4,316,868 | 2/1982 | Esposito et al. | 264/171 |
| 4,411,614 | 10/1983 | Feathers | 425/466 |
| 4,469,743 | 9/1984 | Hiss | 428/215 |
| 4,476,075 | 10/1984 | Brinkmann et al. | 264/40.7 |
| 4,489,154 | 12/1984 | Taylor, Jr. | 430/253 |
| 4,562,023 | 12/1985 | Pabst et al. | 264/75 |
| 4,808,357 | 2/1989 | Bourcier et al. | 264/151 |
| 5,024,895 | 6/1991 | Kavanagh et al. | 428/437 |
| 5,087,502 | 2/1992 | Esposito et al. | 428/156 |
| 5,130,174 | 7/1992 | Esposito | 428/156 |

FOREIGN PATENT DOCUMENTS

56153/90  3/1991  Australia.

Primary Examiner—William P. Watkins, III
Attorney, Agent, or Firm—Rodney B. Carroll

[57] ABSTRACT

Composite coatings are provided having a variable thickness and a gradient coloration in the cross-web direction using a premetered extrusion coating process wherein a pigmented coating composition and a non-pigmented coating composition are simultaneously extruded onto a carrier film. The composite coatings are useful in preparing laminated structures such as automobile windshields with a colored gradient band.

11 Claims, 6 Drawing Sheets

COMPOSITE COATING OF VARIABLE THICKNESS HAVING A GRADIENT COLORATION IN THE CROSS-WEB DIRECTION

BACKGROUND OF THE INVENTION

Field of the Invention

The present invention relates to the preparation of composite coatings which provide a gradient coloration in the cross-web direction. More particularly, a process for preparing a composite coating having a variable thickness in the cross-web direction is provided in which premetered coatings are simultaneously applied to a carrier film, one layer of the coating being of a uniform thickness and another layer being colored and of variable thickness in the cross-web direction when measured either from the center or an edge of the web. Coloration of the layer of variable thickness provides a gradient in the optical density of the composite which makes it suitable for use as an interlayer for providing a vignette stripe in an automobile windshield.

A premetered coating apparatus consisting of dimensionally stable and chemically inert pieces forming a coating die may be modified in accordance with the invention for use in preparing the novel coatings. A flow channel for the coating fluid is formed by openings carved into the die pieces, by openings formed when the die pieces are assembled, or both. Typical practice is to configure the interior geometry of the die so that coating fluid is extruded in a sheet of uniform thickness.

BRIEF DESCRIPTION OF PRIOR ART

It is known to provide a color image having a continuous gradation in the cross-web direction by coating techniques such as gravure printing. Products having such a variation find utility in packaging applications as well as in safety glass for automobiles and in architectural applications.

In some applications, the gradated color stripe is formed by coextruding a molten colored layer along with a clear thermoplastic sheeting. U.S. Pat. No. 4,316,868 describes one such process. In these processes, the colored stripe is embedded in and forms an integral part of the thermoplastic sheeting.

Both of the just-mentioned processes have inherent limitations. For example, in applications such as gravure printing, the overall quality of the gradated image is dependent on the quality of the engraved gravure cylinder. Applications which utilize pigment based coating solutions place additional limitations on gravure printing due to accumulation of pigment particles under the doctor blade which is used in the gravure process. This causes streaks in the coated product which is unacceptable especially in applications requiring high optical quality such as in automobile windshields. Further, limited life of the cylinder due to scratching and wearing of the cylinder surface by the doctor blade requires re-engraving of the cylinders on a periodic basis, which adds additional expense. While colored gradations for thermoplastic sheeting for safety laminate applications by a coextrusion process overcomes the quality limitations inherent in gravure printing, flexibility with respect to colors and widths of the gradations is limited. Color and width changes require extensive cleaning of the die and modifications to the die assembly which are costly in terms of down time and labor requirements involved in the operations.

Blade, or knife coating, to provide a tapered cross-web profile is disclosed in Australian published application AU-A-56153/90. In a blade coating process, the wet coated thickness of a layer depends on the physical properties of the coating solution such as viscosity. Precise control of the coating thickness is especially difficult. Precise control is said to be achieved in the Australian application by using a complex pressure feed-back system. Optical density is said to be controlled by mixing two solutions in different proportions. This can lead to nonuniformity of a gradient pattern.

Premetered coating processes such as slot coating have been used to produce uniform coating thickness in the cross-web direction. U.S. Pat. No. 4,411,614 describes one such process wherein inserts in flow distribution channels are used to improve the flow uniformity of coating solutions in the cross-web direction. Such processes have not been used to provide coatings of variable thickness in the cross-web direction.

Simultaneous coating of more than one layer is also practiced in pre-metered coating processes. U.S. Pat. No. 2,901,770 describes one such apparatus.

The problems associated with the coating processes heretofore used are solved by this invention which provides an easily controlled process whereby a composite coating is deposited on a carrier film to provide an optical density gradient coating of superior quality. The composite coating can be readily transferred to an adhesive film such as polyvinyl butyral for incorporation in a laminated safety glass structure. The process offers additional advantages since coatings having a variable density when measured either from the center or an edge of the web and coatings of various widths may be produced prior to transfer. Further, in such a process, the coatings may be optically inspected prior to transfer and thus offer opportunities to minimize waste.

SUMMARY OF THE INVENTION

In the process of this invention a composite coating of variable thickness and a gradient coloration in the cross-web direction when measured either from the center or an edge of the web is provided by depositing coatings of a layer of a non-pigmented thermoplastic binder resin onto a carrier film and a colored coating of variable thickness in the cross-web direction on top of said layer of non-pigmented binder resin. The coatings when applied as a solvent-containing solution are dried to remove the solvent and provide a solvent-free composite coating on the carrier film. Coatings are provided which taper from a minimum to a maximum thickness from each edge of the film to the center of the film, or alternatively, from the center of the film to each edge of the film. The composite coatings can be optically inspected prior to being slit to a selected width and incorporated in a laminated structure such as being transferred to an adhesive interlayer sheet to provide a laminated glazing structure having an optical density gradient band.

The coatings are premetered through an extrusion die having a slot opening and distribution channels. In one embodiment, a distribution channel is configured to provide a coating of variable thickness in the cross-web direction and another distribution channel is configured to provide a coating of uniform thickness across the web. In a preferred embodiment internal shims are positioned in the distribution channel. The shims are shaped to deposit colored or pigmented coating in a variable thickness in the cross-web direction. The pigmented coating material is pumped through the top section of the extrusion die. Simultaneously, a non-pigmented coating material is pumped through the bottom section of the extrusion die at a rate to provide a coating of uniform thickness. The two coating compositions are superimposed in layers as they are extruded from the slot opening in the die.

Alternatively, the required thickness distribution of the coatings can be obtained by configuring an extrusion die with the flow channel carved in the walls of the die to direct the coating composition to the required thickness distribution.

Included within the scope of this invention are variations of those just-mentioned in which additional layers of coating solution are applied sequentially or simultaneously. Such additional layers may be pigmented or non-pigmented. These additional layers may have a uniform thickness or a gradated thickness.

DETAILED DESCRIPTION OF THE INVENTION

Figure 1:
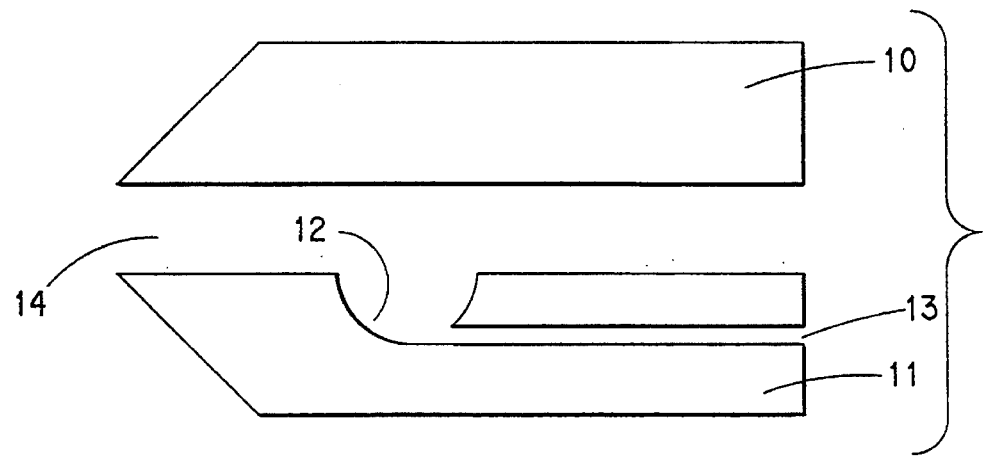
FIG. 1 is a side elevation view of an extrusion coating die.

Referring now to FIG. 1, the coating apparatus shown is used in carrying out a premetered coating process. This type of coating process is distinguished from other processes in that the rate of deposition of coating fluid is controlled by the rate at which the fluid is delivered to the die. The extrusion die is formed from a top piece 10 and a bottom piece 12 fabricated from dimensionally stable and chemically inert material. Stainless steel is typically used, but other suitable materials may be used. A distribution channel is carved in the top piece, the bottom piece, or in both pieces to distribute the coating fluid across the width of the die. FIG. 1 shows a distribution channel 12 carved in bottom piece 11. The coating fluid is formed into a sheet and directed to the web through an extrusion slot 14. Slot 14 is formed either by spacers or shims between the die pieces or by an opening carved into the pieces. In usual practice the combination of the distribution channel geometry and the slot geometry cause the coating fluid to deposit onto a web or carrier film as a sheet having a uniform thickness.

Figure 2:
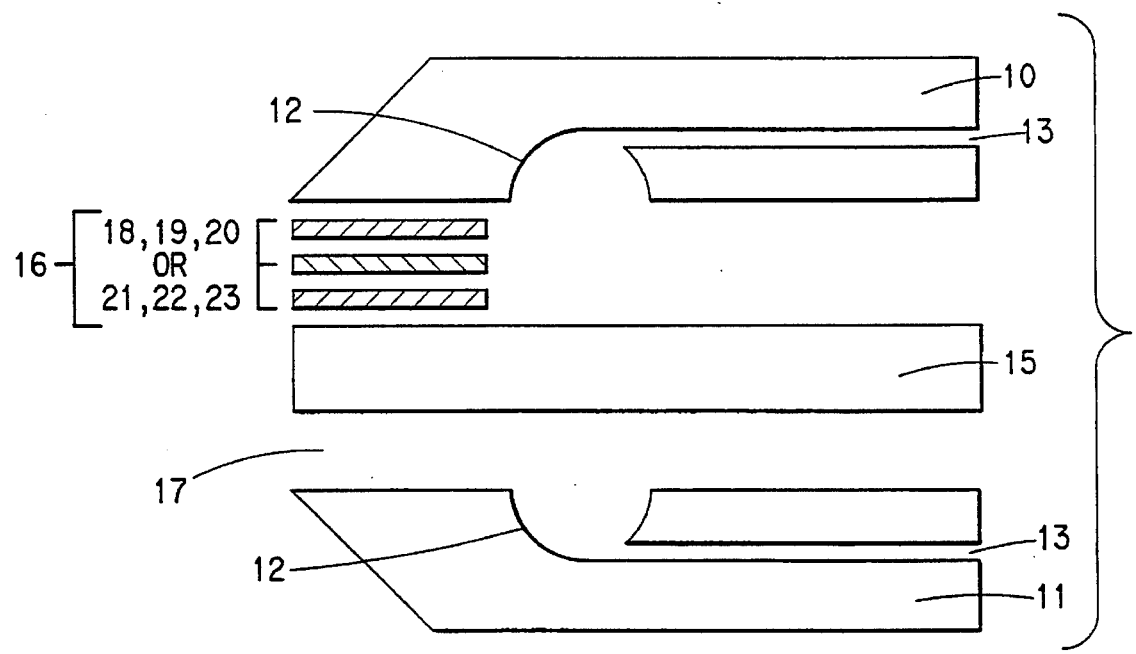
FIG. 2 is a side elevation of a dual-slot extrusion coating die.

FIG. 2 shows the internal structure of a preferred apparatus of this invention. The extrusion die is formed by top piece 10, bottom piece 11 and center piece 15 which separates the two coating layers. Distribution channel 12 is carved in top piece 10 and bottom piece 11. Coating fluid is fed to the two distribution channels 12 by means of feed inlets 13. In some cases, the two distribution channels 12 along with the feed inlets 13 may be carved on either side of center piece 15. Extrusion slot 16 in the top layer is formed by a stack of shims such as 18, 19, 20 or 21, 22, 23 illustrated in FIGS. 3 and 4, respectively. As described below, the said shims in the top layer are shaped to deposit colored or pigmented coating in a variable thickness in the cross-web direction. Extrusion slot 16 may also be formed by an opening carved into top piece 10 or center piece 15. Extrusion slot 17 is formed either by shims between center piece 15 and bottom piece 11 or by an opening carved into the said pieces.

In the design of interiors of coating dies, two basic approaches are used to insure a uniform distribution of coating solution. In the first approach, the distribution channel is large enough for the pressure drop in the distribution channel to be negligible relative to the pressure drop in the slot. Since the variation in the entrance pressure to the slot is negligible, the variation in the flow rate through the slot is negligible. In the second approach, the distribution channel is designed so that the sum of the pressure drop in the distribution channel and the pressure drop in the slot is uniform across the die width. In the present invention, these two approaches are extended to design die interiors so that there is a gradient in the flow rate in the cross-web direction.

Figure 7A:
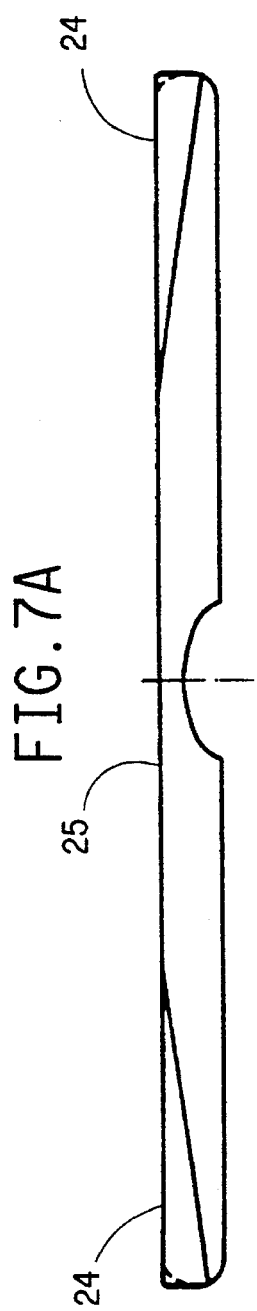
FIGS. 7A, 7B and 7C are a schematic representation of an insert for a die cavity.
Figure 7B:
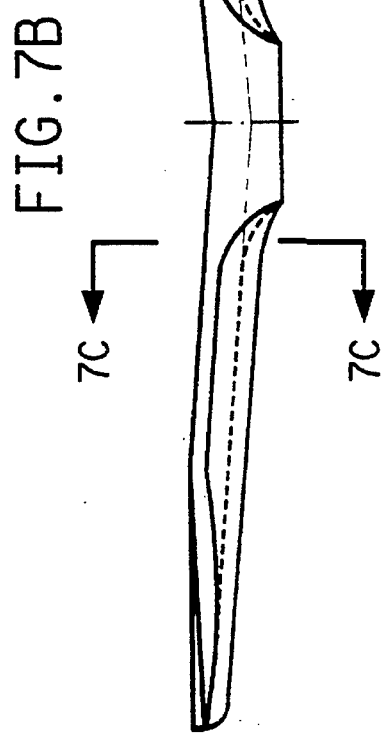
Figure 7C:
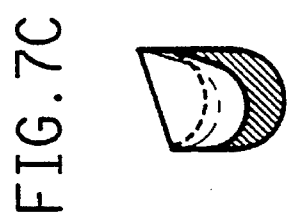

The embodiment shown in FIG. 7, utilizes an insert which may be positioned in the distribution channel of the dies shown in FIGS. 1 and 2 which changes the geometry of the channel. As shown in FIG. 7, the land length is made longer in regions 24 at the edge of the coating. There is no change in land length in region 25 at the center of the coating. These changes in geometry cause more flow in the center of the coating and less flow at the edges of the coating since greater land length causes more restriction to flow. The present invention also covers inserts with land length variation in the central region of the coating with no variation in the edges of the coating. This insert may be fabricated from metal or a suitable polymeric material that can be molded and will remain dimensionally stable under operating conditions for the die. In another embodiment, the insert is replaced by a shim or a stack of shims designed to provide the desired gradient. Parts of these shims fill previously open regions of the slot and alter the interior geometry of the slot. Since the pressure drop of a Newtonian fluid flowing through a thin slot is proportional to the length of the slot and inversely proportional to the cube of the slot height, a gradient in the flow rate of coating fluid is achieved.

Figure 3:
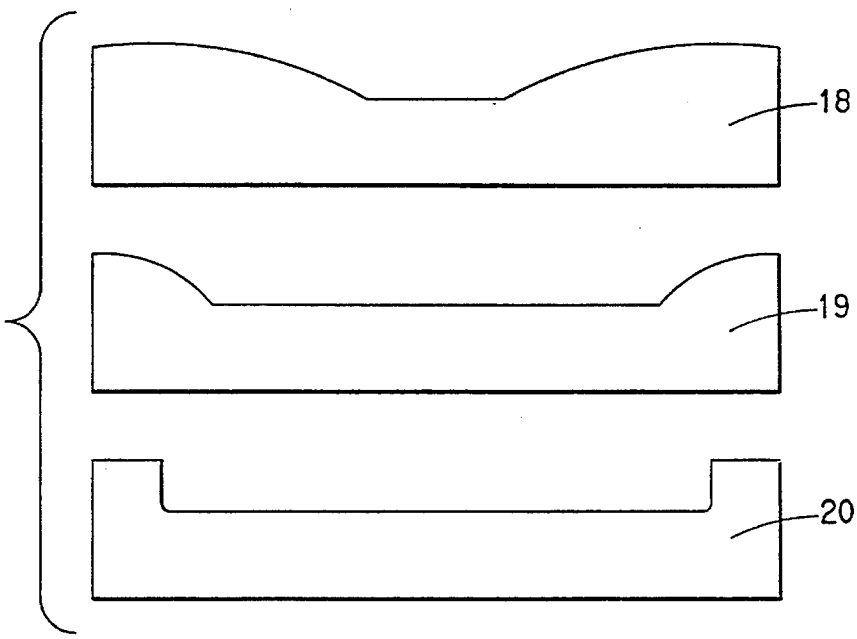
FIG. 3 is a top view of shims which may be stacked together and inserted in the die of FIG. 1 or FIG. 2 to provide a cross-web thickness profile of greatest thickness at the edges of the coating.
Figure 4:
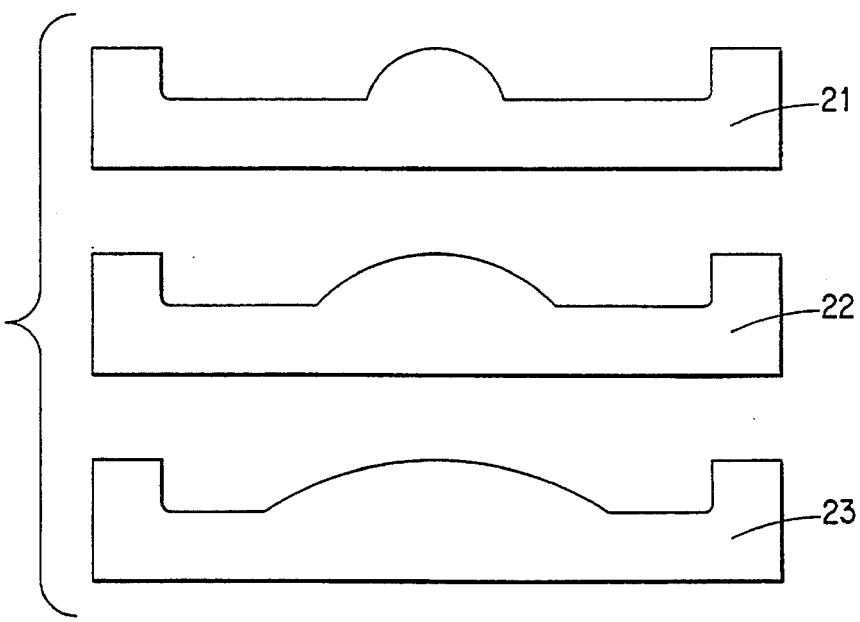
FIG. 4 is a top view of shims which may be stacked together and inserted in the die of FIG. 1 or FIG. 2 to provide a cross-web thickness profile of greatest thickness at the center of the coating.

The different shim design approaches of the current invention can be used to produce cross web coating thickness gradients. One approach, referred to as the edge taper approach is designed to produce coating thickness gradients at the edges of the coating in the cross-web direction. The top view as shown in FIG. 3 of the shape of the individual shims 18, 19 and 20 which are stacked together to obtain edge taper coating is schematically shown in FIG. 3. Another approach, referred to as the center taper approach is designed to provide coating thickness gradients in the center of the coating in the cross-web direction. As shown in FIG. 4, shims 21, 22 and 23 are stacked together to obtain coating thickness gradients in the center of the coating. The shape of the individual shims and the number of shims stacked together may be changed, depending on the desired cross-web coating thickness profile, the properties of the coating fluid and the coating process conditions.

Figure 5:
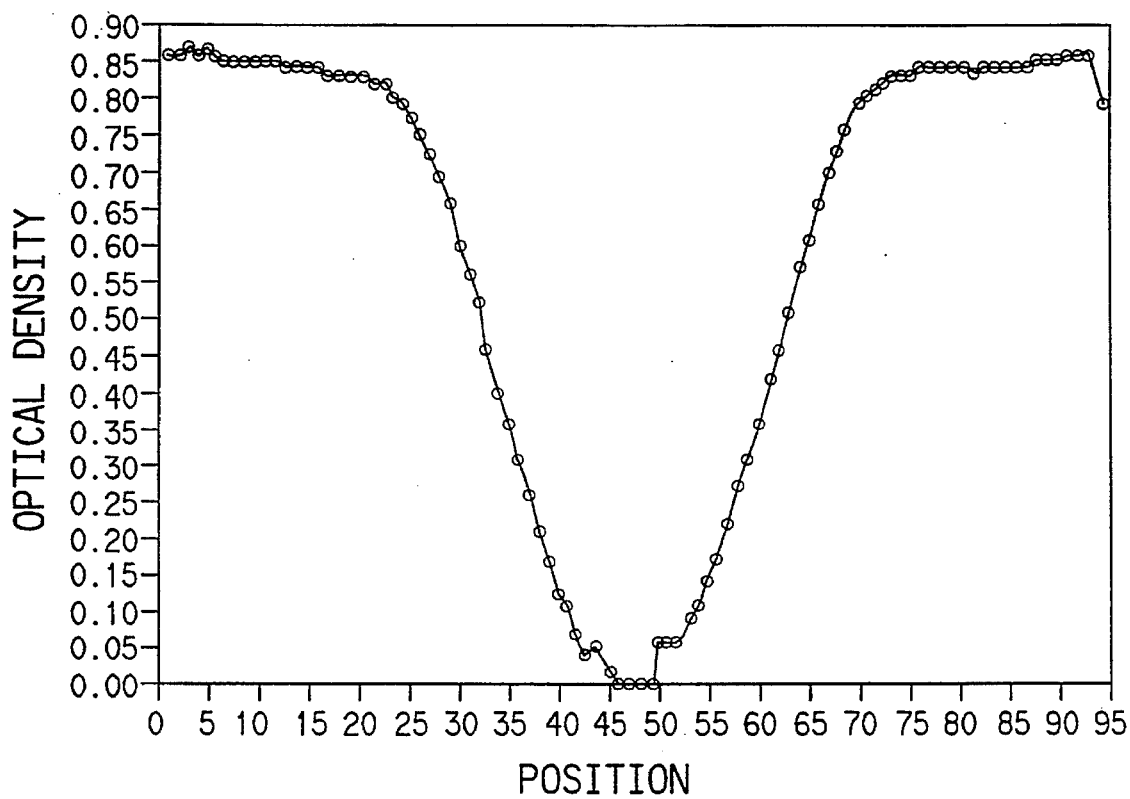
FIG. 5 is an optical density profile obtained using the stack of shims shown in FIG. 3.
Figure 6:
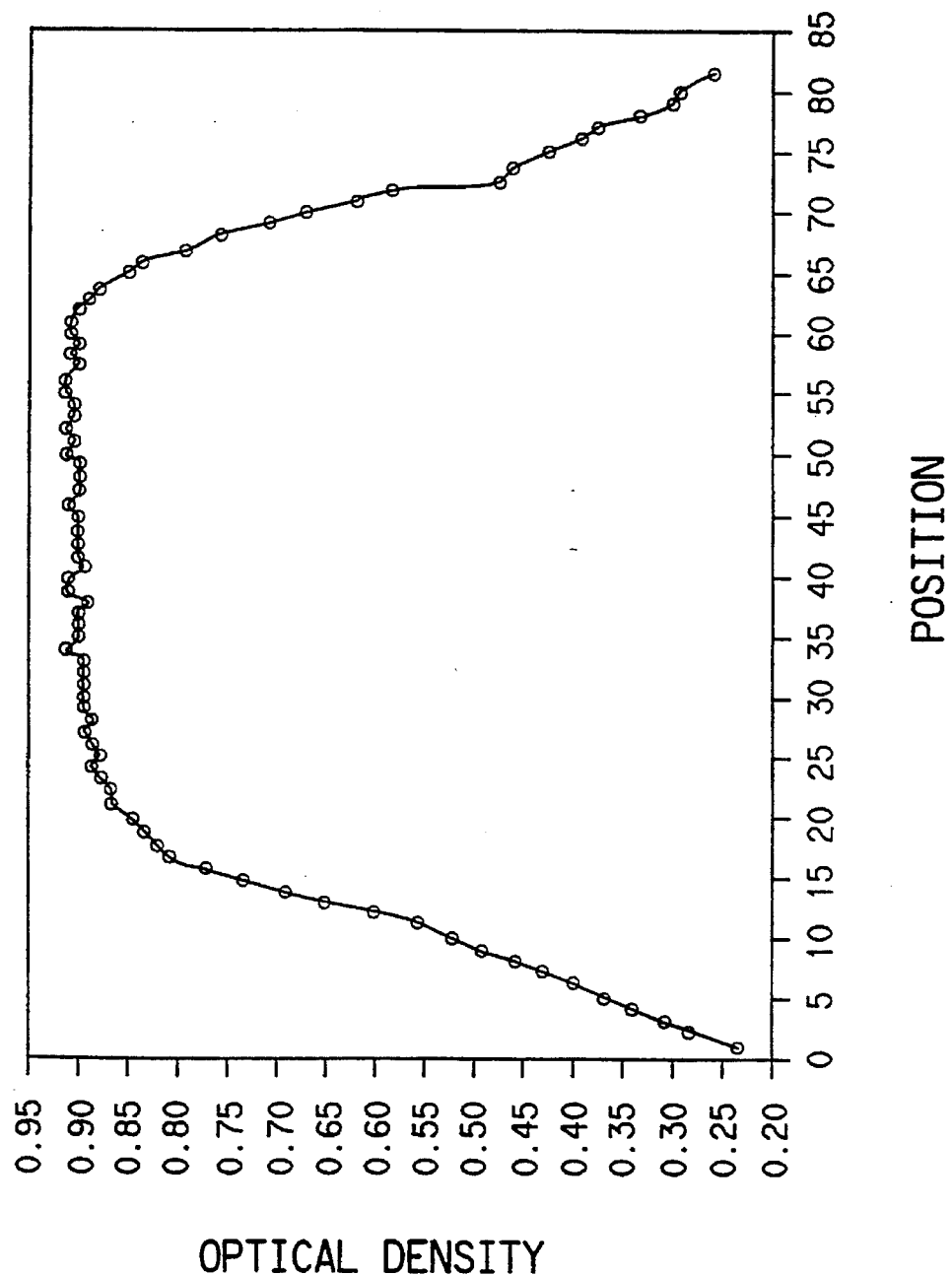
FIG. 6 is an Optical density profile obtained using the stack of shims shown in FIG. 4.

Coating thickness variation in the cross-web direction is found to result in a corresponding cross-web optical density variation when the coating contains colorants. FIG. 6 and FIG. 5 in the Example described below shows optical density variations for the edge taper and center taper approaches, respectively. For applications such as in automobile windshields, the coating is slit in the central portion to result in potentially two gradient bands. In some applications, it may be advantageous to coat several sets of two or more coatings by appropriate design of the die or stack of shims or both.

Figure 9:
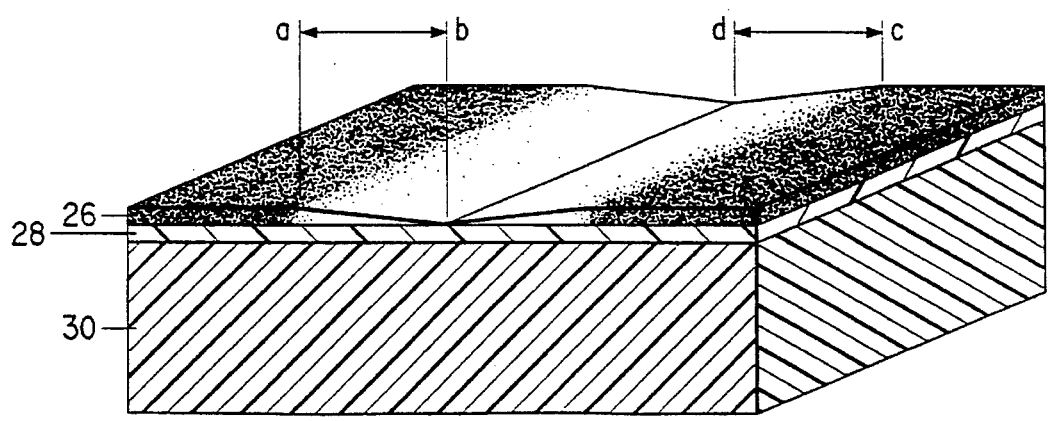
FIG. 9 is a section of one embodiment of the product of this invention showing the optical density profile of FIG. 5.

FIG. 9 shows one embodiment of the product of this invention. A composite structure is provided consisting of a carrier film 30 having a first layer of polymeric binder resin 28 and a colored polymeric binder resin layer 26 having a variable thickness and a gradient coloration (a-b and c-d) in the cross-web direction when measured either from the center or an edge of the web.

In a further embodiment of the invention, the interior geometry of the die is machined to give the desired flow profile. FIG. 7 is a schematic representation of a die insert used in a die cavity to obtain a flow variation in the cross-web direction. This can be achieved by appropriate design of the distribution channel, extrusion slot, or both.

An advantage of the insert and especially of the shim designs is the economic advantage of providing a new and desired flow profile without the expense of fabricating a new die. The specially designed die has the advantage of production robustness.

This invention also encompasses coating multiple layers of coating solution either sequentially or simultaneously. In a preferred embodiment, a non-pigmented solution can be coated with a uniform cross-web thickness profile directly onto the web substrate and a pigmented solution coated with a variable cross-web thickness profile on top of the non-pigmented layer. There may be cases in which the reverse order of layers may be preferable. Coating thickness of the two layers is determined by several factors such as optical density of the colored layer, cross-web coating thickness profile and the desired properties of the coating. Maximum dried coating thickness of the individual layers is about 100 microns.

In carrying out the process of this invention, a pigmented coating composition is prepared by dispersing colorant or pigments in a binder resin. A non-pigmented resin solution is prepared by dissolving the binder resin in a suitable solvent or solvent blend. The resin selected may be the same or different from that used in preparing the pigmented dispersion. Coating is accomplished at speeds from 9.14 meters per minute (30 feet per minute) to 152.4 meters per minute (500 feet per minute). The coatings are immediately dried after being deposited on the carrier film.

Pigments used for coloration are preferably crystalline solids with extremely fine particle size having specific surface areas between 25 and 600 square meters/gram as measured by the BET (Brunauer-Emmett-Teller) method. In selecting the pigments, color stability is an important factor particularly in outdoor applications such as automobile windshields. Light fast pigments such as copper phthalocyanine blue, copper phthalocyanine green, carbazole violet, anthraquinone red, quinacridone red, cadmium sulfoselenide red, monoazo red, azo condensation yellow, monoarylide yellow, diarylide yellow as well as carbon black or combinations of pigments may be used. In some applications it may be advantageous to use a combination of pigments and dyes for achieving a balance of color stability and reduced haze.

In preparing the inks for use in this invention, suitable binder resins include nitrocellulose, cellulose esters such as cellulose acetate butyrate, cellulose acetate propionate and cellulose acetate, and polyvinyl acetals such as polyvinyl butyral. Preferred binder resins are polyvinyl butyrals having a hydroxyl content, calculated as polyvinyl alcohol, from about 10 to 35% by weight. The polyvinyl acetate content of these resins is from about 0 to 5% and the polyvinyl butyral content is from about 60 to 90% by weight. The weight average molecular weight of these resins as determined by size exclusion chromatography is from about 10,000 to 250,000. The content of the polyvinyl alcohol, polyvinyl acetate and the polyvinyl butyral along with the weight average molecular weight strongly influences various properties of the ink such as surface tension, solvent/solvent blend selection, transfer conditions, adhesion and shatter resistance of the film transfer coating when used in safety glass applications. Preferred binder resin loadings in the inks, expressed as weight percent of the binder resin in the coating ink solution is about 0.1 to 40%.

The solvent or solvent blend should be chemically inert to the materials used in the carrier film. Preferred solvents in amounts from about 28 to 99% by weight of the ink which can be used are alcohols such as methanol, ethanol, n-propanol, iso-propanol, n-butanol, iso-butanol, diacetone alcohol and benzyl alcohol, glycol ethers such as 1-methoxy-2-propanol, butyl glycol and methoxy butanol, esters such as glycolic acid-n-butyl ester, ketones such as cyclohexanone, and N-methyl-2-pyrrolidone. In addition non-solvents and solvents possessing limited solubility such as methyl ethyl ketone, methyl iso-butyl ketone, methyl acetate, ethyl acetate, n-butyl acetate, aliphatic and aromatic hydrocarbons such as cyclohexane and toluene, may be used in conjunction with solvents.

Dispersants are useful in preparing the pigment based inks used in this invention. The choice of dispersant will depend on the pigment, binder resin and the solvent used in the inks. Additives may be used in the inks and the binder resin coatings to enhance the flexibility of the coatings such as plasticizers. In addition, non-ionic surfactants may be used to reduce surface tension of the ink and to aid in wetting and leveling of the coating on the carrier film.

The carrier film may be selected from such materials as polypropylene, polyester, polyamide and polyvinyl fluoride films. The thickness of the film is generally about 0.00127 to 0.0762 centimeters (0.0005–0.03 inch). The carrier film may be treated to a desired surface tension level through flame treatment or corona treatment which is well known to those skilled in the art.

The products of this invention are particularly useful for thermal transfer to thermoplastic sheeting having a roughshed surface, such as plasticized polyvinyl butyral used in safety glass laminates. The composite structure transfers readily to the roughened surface at moderate temperatures by passing the polyvinyl butyral sheeting and the composite in contact with each other through nip rolls heated to −1° to 150° C. (30° to 300° F.). By providing a non-pigmented coating of uniform thickness across the carrier film, the pigmented coating which varies from a maximum thickness to essentially zero is supported during the transfer, and the quality of the optical gradient is not disturbed in the transfer process.

The products of this invention may be used directly in preparing laminates. For example, a glass/plastic laminate may be prepared by adhering the composite to a glass sheet using a suitable known adhesive materials such as polyvinyl butyral or polyurethane film. The carrier film may or may not be coated with a known antiabrasion coating of the type disclosed in U.S. Pat. Nos. 4,177,315 and 4,469,743.

The invention is further illustrated by the following examples in which parts and percentages are by weight unless otherwise indicated.

EXAMPLE 1

The stack of shims illustrated in FIG. 3 and FIG. 4 were inserted in an extrusion die as shown in FIG. 2 and used to coat edge and center taper coatings respectively. The shims were used in the assembly of the top layer of a two layer extrusion die. The die for the bottom layer was designed to coat a uniform thickness of the coating solution in the cross-web direction. A pigmented solution was applied through the top layer of the die and a non-pigmented solution was applied through the bottom layer of the die. The following are the compositions of the individual layers:

| Pigmented solution: | |
|---|---|
| Carbon black | 0.90% |
| Polyvinylbutyral resin | 13.10% |
| 1-propanol | 38.70% |
| 1-methoxy-2-propanol | 38.70% |
| n-methyl-2-pyrrolidone | 8.60% |
| Non-pigmented solution: | |
| Polyvinylbutyral resin | 9.81% |
| 1-propanol | 60.08% |
| 1-methoxy-2-propanol | 24.71% |
| n-methyl-2-pyrrolidone | 5.45% |

The coatings were applied on a 0.0051 centimeter (0.002 inch) thick polyethylene terephthalate film at a speed of 45.72 meters per minute (150 feet per minute). The coating width was 30.48 centimeters (12 inches). After application of the coating solution, the film was passed through an air dryer set at 66° C. (150° F.) to remove the solvents. The average coating thickness of the dried composite coating was 2 microns. The coating thickness of the composite coatings was determined in the central portion of the edge taper approach and edge portion of the center taper approach since the coating thickness, which is characterized by constant optical density, is essentially constant as shown in the optical density profiles in FIG. 5 and FIG. 6 discussed below. Optical density was determined in equal increments over the 30.48 centimeter width of the coating with a transmission densitometer (Model TD-904, Macbeth, A division of Kollmorgen Corporation, Newburgh, N.Y.). For example, the position number shown in FIG. 6 has been divided into 95 equal segments which are spaced 0.3208 centimeters (0.1263 inches) from each other.

As shown in FIG. 6, the optical density as a function of position on the web varies from nearly zero at the edges corresponding to nearly zero coating thickness of the pigmented layer to a maximum value at the center corresponding to the darkest area of the band. In the center taper bands, the optical density profile on FIG. 5 varies from nearly zero at the center corresponding to nearly zero coating thickness of the pigmented layer to a maximum value at the edges, corresponding to maximum coating thickness. To form the stripe required for a vehicle windshield, the coated band is slit down the center to yield two stripe patterns.

EXAMPLE 2

Figure 8:
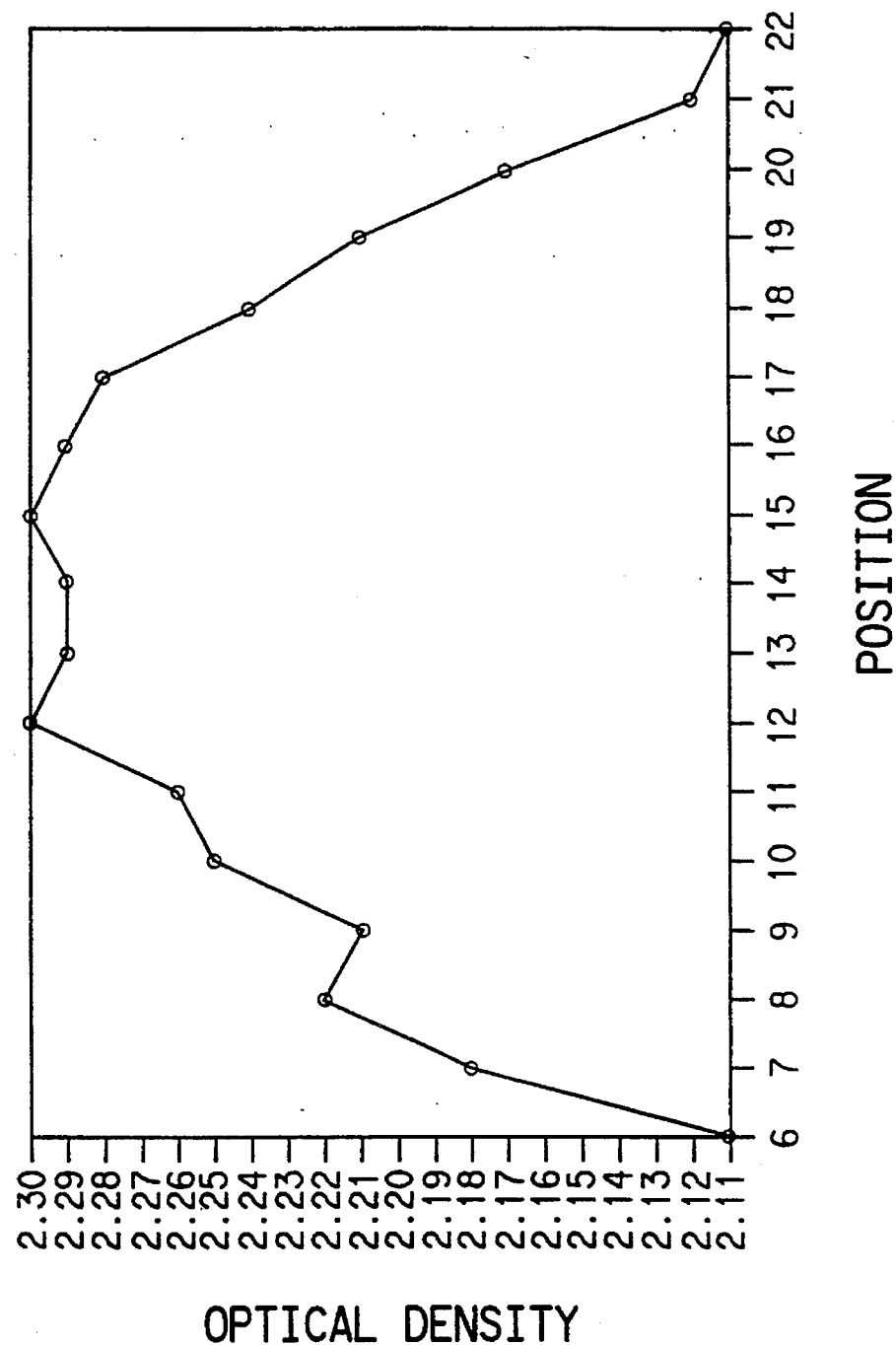
FIG. 8 is an optical density profile obtained with an insert of the type shown in FIG. 7.

A coating was made with the die insert illustrated in FIG. 7. This insert was placed in the cavity of a single layer coating die. The insert was designed to produce edge taper coating by directing more of the coating flow to the center of the die and relatively less of the flow to the edges of the die. The solution composition for this coating is given in U.S. Pat. No. 4,489,154, "Process for Preparing a Surprint Proof" to H. W. Taylor The coatings were applied at a speed of 15.24 meters per minute (50 feet per minute) to a 0.0051 centimeter (0.002 inch) thick polyester film. The coating width was 30.48 centimeters (12 inches). After application of the coating, the web was passed through an air drier set at 77° C. (170° F.) to volatilize the solvent. The corresponding optical density profile of the final film was determined as described in Example 1 and displayed in FIG. 8.

The above example illustrates that coating thickness variation in the cross-web direction can be achieved by appropriate design of the cavity of a die.

What is claimed is:

1. A process for preparing a composite coating of variable thickness and a gradient coloration in the cross-web direction comprising depositing onto a carrier film,
   (a) a layer of polymeric binder resin solution having a uniform thickness across the width of the film and a layer of colored polymeric binder resin of variable thickness in the cross-web direction and having a gradient coloration in the cross-web direction when measured either from the center or the edge of the web, said variable thickness tapering from a minimum to a maximum from each edge to the center of said film or from a maximum to a minimum from each edge to the center of said film, and
   (b) drying the coatings to provide a dry composite coating,
   (c) said individual layers having a maximum dried coating thickness of about 100 microns.

2. The process of claim 1 wherein said solutions are premetered through an extrusion die (10, 11, 12, 13) having a slot opening (14), said die being configured to provide a flow rate gradient for said colored binder resin solution (26) through said slot opening (14) in the cross-web direction.

3. The process of claim 1 wherein the said thickness gradient (a-b, c-d) is provided by a distribution channel (12) having internal shims (18, 19, 20) positioned in said distribution channel, said shims being configured to provide a predetermined flow rate gradient in the cross-web direction.

4. The process of claim 1 wherein the said colored coating solution (26) contains pigments.

5. The process of claim 1 wherein said polymeric resin is polyvinyl butyral.

6. The process of claim 1 wherein the surface of the said composite coating is coated with a layer of non-pigmented binder resin solution.

7. The process of claim 1 wherein the layers are deposited simultaneously.

8. A carrier film having a composite coating thereon comprised of a layer of polymeric binder resin having a uniform thickness and a colored polymeric binder resin layer having a variable thickness and a gradient coloration in the cross-web direction when measured either from the center or an edge of the web, said variable thickness tapering from a minimum to a maximum from each edge to the center of said web, said individual layers having a maximum dried coating thickness of about 100 microns.

9. The product of claim 8 wherein said binder resin is polyvinyl butyral.

10. The product of claim 8 wherein said colorants are pigments.

11. The product of claim 8 wherein said film is selected from the group consisting of polyester, polyproplyene, polyamide and polyvinyl fluoride films.

* * * * *

UNITED STATES PATENT AND TRADEMARK OFFICE
CERTIFICATE OF CORRECTION

PATENT NO. : 5,500,274

DATED : March 19, 1996

INVENTOR(S) : DEBRA C. FRANCIS, SIVA V. VALLABHANENI, BERT C. WONG

It is certified that error appears in the above-identified patent and that said Letters Patent is hereby corrected as shown below:

Column 8:
Claim 8, line 58, after "web" delete "," and insert --or from a maximum to a minimum from each edge to the center of said web,--

Signed and Sealed this

Thirtieth Day of July, 1996

Attest:

BRUCE LEHMAN

*Attesting Officer*  *Commissioner of Patents and Trademarks*